United States Patent
Boyer

(10) Patent No.: US 8,627,936 B2
(45) Date of Patent: Jan. 14, 2014

(54) ELECTROMAGNETIC DIFFERENTIAL SPEED CONTROL SYSTEM FOR A FLUID COUPLING DEVICE

(75) Inventor: Rick L. Boyer, Marshall, MI (US)

(73) Assignee: BorgWarner Inc., Auburn Hills, MI (US)

( * ) Notice: Subject to any disclaimer, the term of this patent is extended or adjusted under 35 U.S.C. 154(b) by 926 days.

(21) Appl. No.: 12/304,568

(22) PCT Filed: Jul. 5, 2007

(86) PCT No.: PCT/US2007/015607
§ 371 (c)(1),
(2), (4) Date: Oct. 17, 2009

(87) PCT Pub. No.: WO2008/005551
PCT Pub. Date: Jan. 10, 2008

(65) Prior Publication Data
US 2010/0059325 A1    Mar. 11, 2010

Related U.S. Application Data

(60) Provisional application No. 60/806,638, filed on Jul. 6, 2006.

(51) Int. Cl.
*F16D 35/02* (2006.01)
(52) U.S. Cl.
USPC .................................. 192/58.61; 192/30 W

(58) Field of Classification Search
USPC .................................. 192/58.6–58.62, 30 W
See application file for complete search history.

(56) References Cited

U.S. PATENT DOCUMENTS

| | | | |
|---|---|---|---|
| 4,650,045 A * | 3/1987 | Weible et al. | 192/58.61 |
| 4,874,072 A | 10/1989 | Mohan | |
| 5,030,865 A * | 7/1991 | Rockey et al. | 310/78 |
| 5,152,383 A | 10/1992 | Boyer | |
| 5,152,384 A * | 10/1992 | Brown | 192/58.61 |
| 5,309,094 A * | 5/1994 | Rigaux et al. | 324/174 |
| 7,914,264 B2 * | 3/2011 | Baumgartner et al. | 417/223 |

FOREIGN PATENT DOCUMENTS

EP    1630443    3/2006

* cited by examiner

*Primary Examiner* — Richard M. Lorence

(57) ABSTRACT

A speed monitoring system (6) for a fluid-coupling device (10) includes a hub (44) and a ring magnet (220). The hub (44) rotates at a first speed that is proportional to an input clutch speed of a fluidically engageable input member. The ring magnet (220) rotates at a second speed that is proportional to an output clutch speed of a fluidically engageable output member. A magnetic sensor (232) generates a differential speed signal of the ring magnet (220) relative to the first speed. A controller (54) generates an actual speed signal indicative of the second speed in response to said differential speed signal.

13 Claims, 5 Drawing Sheets

ELECTROMAGNETIC DIFFERENTIAL SPEED CONTROL SYSTEM FOR A FLUID COUPLING DEVICE

TECHNICAL FIELD

The present invention relates generally to clutch devices, fluid-coupling devices, and fan drive systems. More specifically, the present invention relates to a technique for electronically and accurately controlling the speed and operation of a fluid-coupling device.

BACKGROUND OF THE INVENTION

The present invention relates to clutch devices of the type including viscous type and non-viscous type.

Although the present invention may be used advantageously in clutch devices having various configurations and applications, it is especially advantageous in a fluid-coupling device of the type used to drive a radiator cooling fan of an internal combustion engine, and will be described in connection therewith.

Fluid-coupling devices ("fan drives") of the viscous shear type have been popular for many years for driving engine cooling fans, primarily because their use results in substantial saving of engine horsepower. The typical fluid-coupling device operates in the engaged, relatively higher speed condition only when cooling is needed, and operates in a disengaged, relatively lower speed condition when little or no cooling is required. Today, to satisfy stiffer fuel economy and noise control requirements, electrically actuated viscous fan drives are commonplace because they can be precisely controlled between an engaged, partially engaged, and disengaged mode to control output at a given fan speed as determined by the vehicle's engine computer.

Current electrically actuated viscous fan drives have the actuator mounted to either the front or the rear side of the fan drive. In both cases, the actuators are mounted to the drives through a ball bearing and the stationary associated electrical wires are tethered to a stationary location on the engine, the shroud, or in some other suitable location. The length of the tether for front mount actuators becomes a limiting factor for large fan applications. The axial length of the tether for rear mount actuators limits such use in narrow package applications. Durability for both front and rear mount designs is a function of bearing life and tether life. A fan drive without a tether would improve durability and lower costs while sustaining desired fan drive performance attributes.

The front mounted electrical actuator design is an improvement over air-actuated viscous fan drives used in heavy truck and large bus applications. Front actuated viscous fan drives, particularly for light-to-medium duty applications, are still in active use today. These fan drives have minimal axial length and less expensive than rear actuated fan drives. However, in some light duty gas engine applications where the fan clutch is driven by a water pump, certain resonance problems may still exist.

Durability issues with the tether and higher fuel economy requirements caused a change of use to pneumatic on-off friction clutches that do not have a tether. Some rear mount electrical actuators have been developed to reduce potential tether durability problems associated with front mount style actuators and to provide customers with easier installation of the fan drive and associated tether.

With an ever increase in industry requirements has come a call for variable speed or at least multi-speed fan drives with improved control. In addition, there is a desire to detect and accurately measure input and output speeds of a fan drive clutch for improved cooling and engine performance. Thus, there exists a need for an improved technique of monitoring the speed of a fluid-coupling device for improved closed-loop control.

SUMMARY OF THE INVENTION

The present invention is an improvement over known fan drives and minimizes or overcomes their disadvantages.

One embodiment of the present invention provides a speed monitoring system for a fluid-coupling device that includes a hub and a ring magnet. The hub rotates at a first speed that is proportional to an input clutch speed of a fluidically engageable input member. The ring magnet rotates at a second speed that is proportional to an output clutch speed of a fluidically engageable output member. A magnetic sensor generates a differential speed signal of the ring magnet relative to the first speed. A controller generates an actual speed signal indicative of the second speed in response to said differential speed signal.

Another embodiment of the present invention, provides an operational control system for a fluid-coupling device that includes a hub, a ring magnet, and a magnetic sensor that are similar to that of the above monitoring system. The control system also includes an input member and an output member that are fluidically engageable with each other and form an operating chamber. A valve is in fluid communication with the operating chamber. A controller controls the engagement of the input member with the output member in response to the differential speed signal generated by the magnetic sensor.

The present invention is suitable for all types of clutches, including viscous and non-viscous types. The embodiments of the present invention provide several advantages. One such advantage is the use of a speed monitoring system having an electromagnetic circuit that is used to monitor the differential speed of an output member relative to the speed of an input member. The speed monitoring system yields a speed sensor that measures the speed differential between the clutch output and the clutch input of a fluid-coupling device, which can be used to determine the actual output speed of the output member.

The present invention allows for more precise control of the mechanisms that coordinate output speed at a given engine input speed and provides controllable cooling to an engine for a given engine operating condition or vehicle state. This improves engine-operating performance in many ways, including improvements in fuel economy and emissions reduction. The present invention also provides such control using several components common with clutch-coupling devices and vehicle engine control.

Other features, benefits and advantages of the present invention will become apparent from the following description of the invention, when viewed in accordance with the attached drawings and appended claims.

DETAILED DESCRIPTION

Figure 1:
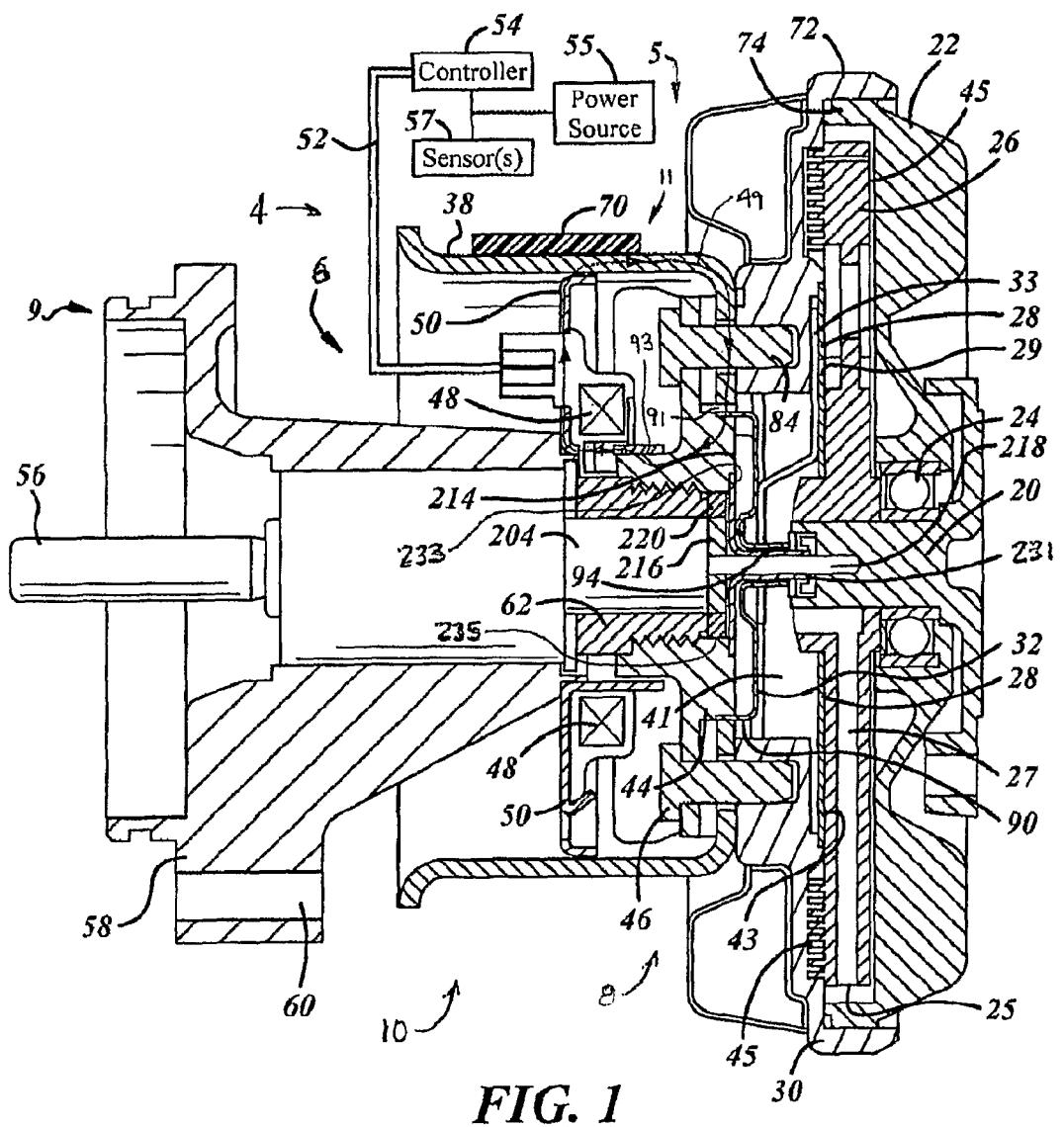
FIG. 1 a cross-sectional, schematic, and block diagrammatic view of a fluid-coupling operational monitoring and control system for a fluid-coupling device in accordance with an embodiment of the present invention.

In the following Figures the same reference numerals will be used to refer to the same components. The present invention relates to and can be used with both viscous and non-viscous drive clutch devices. Although the present invention may be used advantageously in clutch devices having various configurations and applications, it is especially advantageous in an electronically controlled fluid-coupling device of the type used to drive a radiator cooling fan of an internal combustion engine. Although for simplicity the electronically controlled fluid-coupling device of the present invention will be described in connection with a cooling fan, it is to be understood that the invention is not limited to such uses and structures.

Also, a variety of other embodiments are contemplated having different combinations of the below described features of the present invention, having features other than those described herein, or even lacking one or more of those features. As such, it is understood that the invention can be carried out in various other suitable modes.

In the following description, various operating parameters and components are described for one constructed embodiment. These specific parameters and components are included as examples and are not meant to be limiting.

Referring now to FIGS. 1, 2A, and 2B, the electronically controlled fluid-coupling device 10 includes a fluid-coupling operational monitoring and control system 4 that electronically and magnetically monitors and controls a fan drive assembly 5. The control system 4 includes an electromagnetic clutch speed monitoring system 6 and a fan drive activation circuit 8. The speed monitoring system 6, in general, is utilized to monitor the output speed of the fluid-coupling device 10. More specifically, the speed monitoring system 6 is used to monitor the speed of an output shaft 20, which may have fan impellors (not shown) attached thereto, relative to the speed of a rotating input hub 44. The hub 44 may be driven, as shown, by a pulley and belt system 11 for which a pulley 38 and a belt 70 are shown. The fan drive circuit 8 is utilized to engage the fan drive assembly 5 in response to the differential speed output signals received from the speed monitoring system 6 and the known input speed of the hub 44. The fan drive assembly 5 is mechanically coupled and mounted to a water pump assembly 9.

Figure 2:
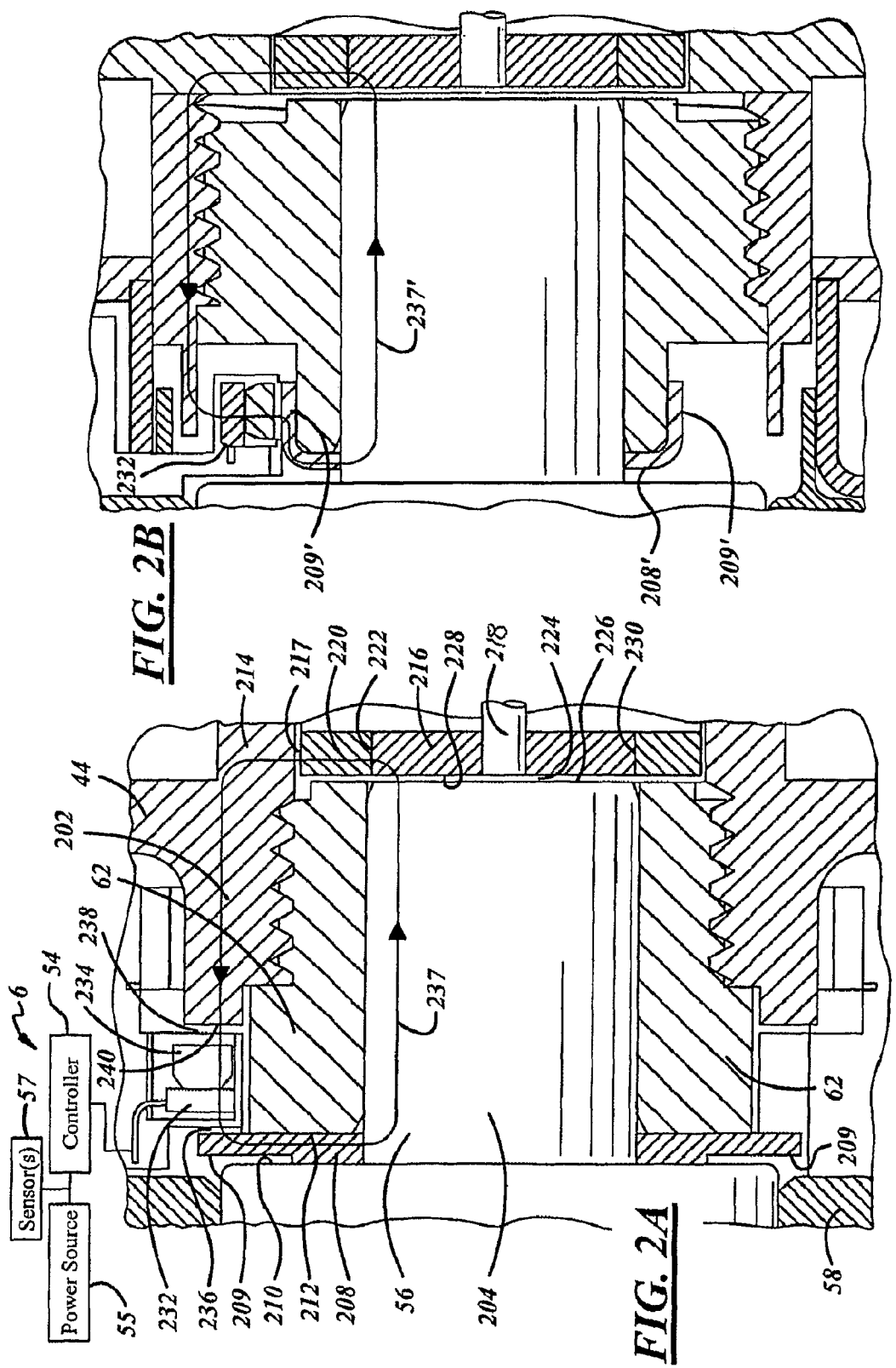
FIG. 2A is a close-up cross-sectional view of an electromagnetic clutch speed monitoring system in association with the fluid-coupling device of FIG. 1.
FIG. 2B is a close-up cross-sectional view of an electromagnetic clutch speed monitoring system in association with a fluid-coupling device in accordance with another embodiment of the present invention.
Figure 3:
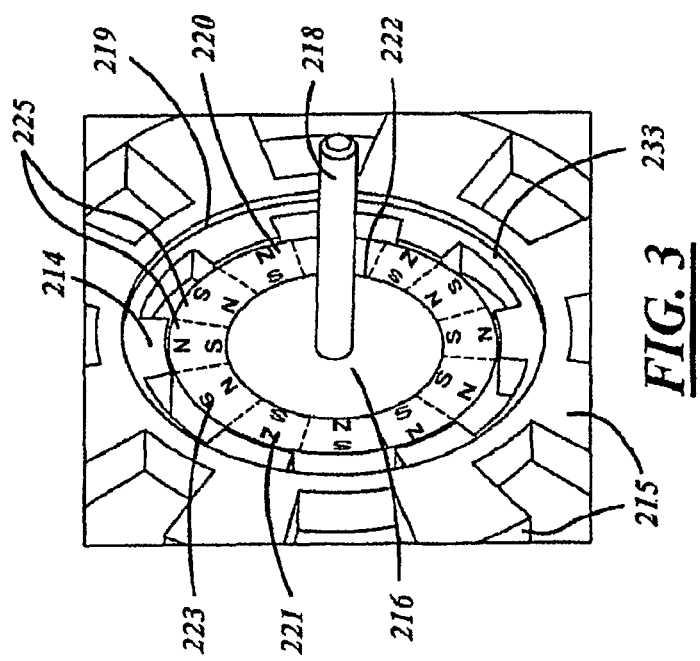
FIG. 3 is a side perspective view illustrating the magnetic coupling relationship between a ring magnet and an magnetically conductive hub of the clutch speed monitoring system of FIG. 2A.

Referring to FIGS. 2 and 3, in which the clutch speed monitoring system 6 is shown. The clutch speed monitoring system 6 includes a stationary magnetic sensor 232 that monitors magnetic flux change through the hub 44. Magnetic flux through the hub 44 is generated and altered by the rotation of a ring magnet 220 within the pole pieces 214 of the hub 44. Alternating directions of magnetic flux generated by the ring magnet 220 is directly proportional to the differential speed between the output shaft 20 and the hub 44, as measured by the magnetic sensor 232. A controller 54 is coupled to the magnetic sensor 232 and is used to monitor this change in magnetic flux.

The magnetic flux generated by the rotation of the ring magnet 220 passes through the hub 44, which is magnetically conductive, to a concentrator 234 and then to the magnetic sensor 232. To complete the electromagnetic differential speed flux loop, the magnetic flux passes from the magnetic sensor 232 to a washer 228, through a shaft 204, and back to the ring magnet 220. The washer 228 is on the pump shaft 56 proximate the magnetic sensor 232. The differential speed flux loop is generally designated by the loop 237. Air gaps 217, 224, 236, and 238 exist, respectively, along the magnetic flux loop 237 between stationary and moving parts and between parts that are moving at different speeds.

The pulley 38, the hub 44, the region 72, and the cover 30 may be considered input members. The input members rotate at a given input clutch speed. The output shaft 20, the rotor 26, the insert 216, and the ring magnet 220 may be considered output members. The output members rotate at a controlled output clutch speed.

The magnetic sensor 232 is mounted within a portion of the stationary housing 58. A concentrator 234 may be attached to the housing 58, as shown, and is used to focus lines of magnetic flux from the threaded center section 202 of the hub 44 to the magnetic sensor 232. The magnetic sensor 232 and the concentrator 234 are disposed between the washer 208 and the hub 44, to detect magnetic flux flow therethrough, and are external to the hub adaptor 62. As shown, the magnetic sensor 232 measures flux flow through the hub 44. The magnetic sensor 232 and the concentrator, although shown as being directed to receive and measure flux flow through the hub 44, may be rotated or reoriented to receive flux flow passing to or through the washer 208 or other flux path component. For example, the magnetic sensor 232 may be rotated 90° and the washer ends 209 may be formed to extend across the hub adaptor 62 towards the ring magnet 220, as shown in FIG. 2B by the washer 208', the ends 209', the magnetic sensor 232', and the modified magnetic flux loop 237'. As such, the magnetic sensor 232 detects flux flow into and through the washer 208. The magnetic sensor 232 and the concentrator 234 are each electrically coupled to the controller 54 and to the power source 55. The magnetic sensor 232 may be in the form a hall effect sensor, a hall effect switching or latching sensor, a magnetic pick-up sensor, an inductive sensor, or in some other form known in the art. The hub 44, the pump shaft 56, and the washer 208 are formed of ferrous or magnetically conductive materials, whereas the hub adaptor 62 is formed of a non-metallic or non-ferrous material(s).

The hub 44 has inner pole pieces 214, and outer pole pieces 215. The pole pieces 214 and 215 rotate at an input speed relative to the magnetic sensor 232. The input pole pieces 214 extend radially inward from a circular shoulder 219. The output pole pieces 215 extend radially outward from the shoulder 219. The pole pieces 214 communicate magnetic flux from the magnet radial poles 221 and 223 into the cylindrical center threaded section 202 of the hub 44. The outer pole pieces 215 are used in the engagement of the fluid-coupling device, which is described in more detail below.

The ring magnet 220 rotates at output speed relative to the stationary magnetic sensor 232. The ring magnet 220 has the altering radial poles 221 and 223 and is attached to a radially outward surface 222 of an insert 216. The insert 216 rides on a center projection 218 of a water pump shaft 56, which is in rotation with the output shaft 20. The poles 221 and 223 are associated with respective alternating material sections 225, which may be magnetic and contain ferromagnetic materials. The alternating material sections 225 may be permanently magnetized to provide the stated alternating poles 221 and 223 or may become magnetized upon introduction of a magnetic field. For example, a coil or some other magnetic field generating device (not shown) may generate a magnetic field and cause current to flow through and magnetize the alternating material sections 225. In an alternative embodiment electrical current is directly supplied to the ring magnet 220 to charge the alternating material sections 225. Note that although the ring magnet 220 is shown in the form of a continuous material ring-shaped structure, one skilled in the art would readily recognize that other configurations may be used. The ring magnet 220 may be notched, such that teeth or projections (not shown) thereof are positively or negatively charged. In such an embodiment, every other material section is non-existent. The configuration of the ring magnet 220 and the operational combination of the ring magnet 220 and the magnet sensor 232 are herein provided for example purposes only; other configurations and operational combinations may be utilized.

The controller 54 may be microprocessor based such as a computer that has a central processing unit, a memory (RAM and/or ROM), and associated input and output buses. The controller 54 may be application-specific integrated circuits or may be formed of other logic devices and circuits known in the art. The controller 54 may be a portion of a central vehicle main control unit, a control circuit having a power supply, combined into a single integrated controller, located on or off the fan drive assembly 5, on or off the fluid-coupling device 10, may be a stand-alone controller, or be a combination of multiple controllers.

The air gaps 217, 224, 236, and 238 provide for separation between moving and non-moving parts. The air gap 217 is defined by and is between the ring magnet 220 and the hub 44. The air gap 224 is defined by and is between the end 226 of the water pump shaft 56 and the respective inner side 228 of the insert 216. The air gap 236 is defined by and is between the washer 208 and the magnetic sensor 232. The air gap 238 is defined by and is between the end 240 of the center section 202 and the concentrator 234.

The hub 44, the pump shaft 56, the plate 208, the projection 218, and the insert 216 may be formed of various materials and material combinations. The hub 44, the pump shaft 56, the plate 208, the projection 218, and the insert 216 may be formed of a metallic or ferrous material, such as steel or other conductively suitable material known in the art.

Figure 4:
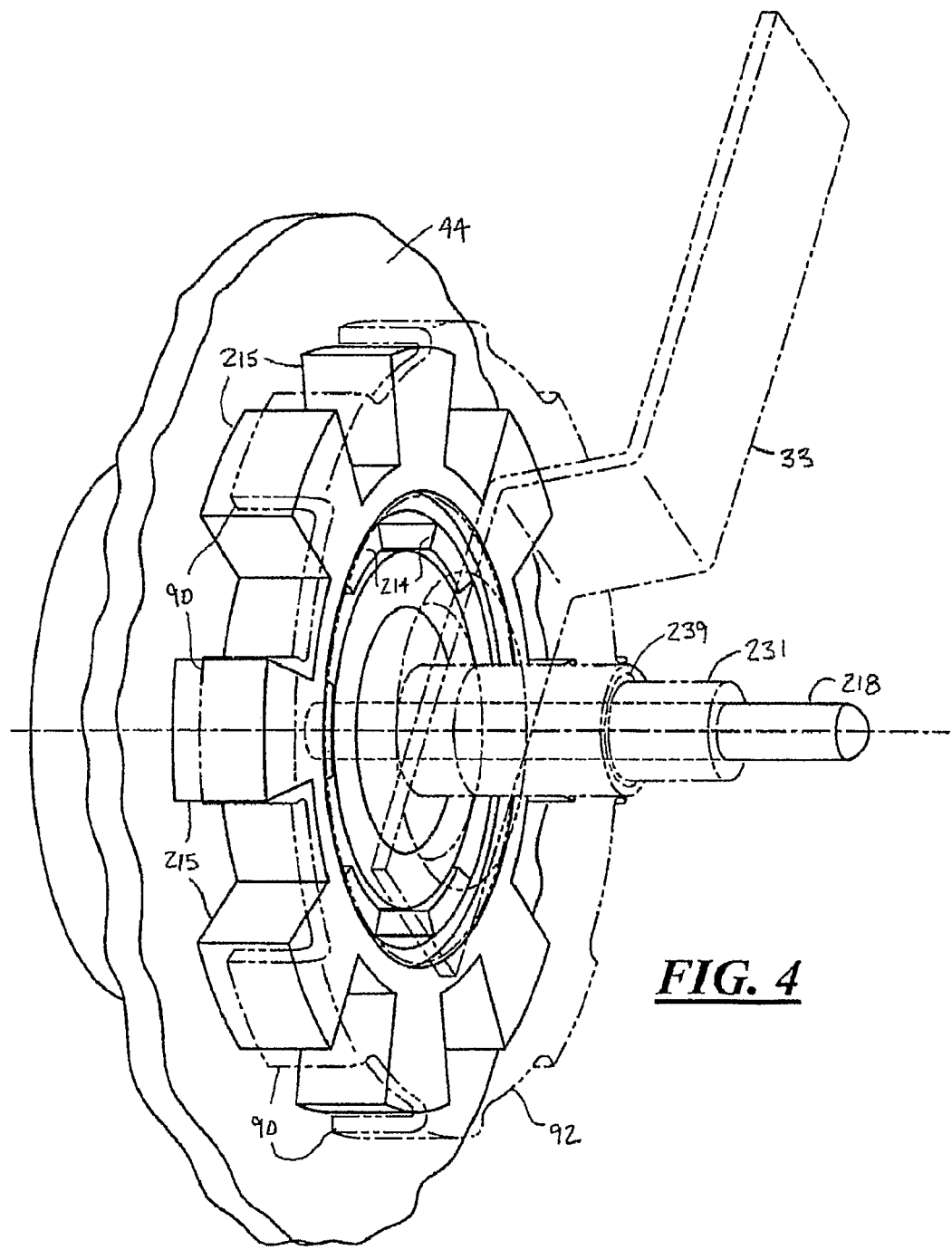
FIG. 4 is a perspective view illustrating the magnetic coupling relationship between the magnetically conductive hub and an armature assembly for activation control of the fluid-coupling device of FIG. 1.

Referring now to FIGS. 1, 3, and 4, the fan drive assembly 5 includes a body 22 that is mounted to the output shaft 20, a reservoir plate 28 that has a fill port 29, and an armature valve subassembly 32 that has an attached valve arm 33. The armature valve subassembly 32 in combination with the fill port 29 perform as a valve, which is used to control the amount of fluid flowing into the operating chamber 45. The output shaft 20 is rotatably mounted to the body 22 by a bearing member 24. Although not shown, the output shaft 20 may be coupled to a fan that has fan blades. Thus, the rotation of output shaft 20 rotates the fan to cool a radiator or other engine components, as desired. A rotor member 26 is attached to the output shaft 20 and is engageable with the cover member 30. The fan drive assembly 5 also includes the pulley 38 and the hub 44, which rotate the cover member 30. The body 22 and the cover 30 have fins along their outer peripheries for heat dissipation.

The activation circuit 8 includes a coil 48 that is mounted to a housing 50, which is mounted to the stationary water pump subassembly 9. The coil 48 has a wire harness 52 that is electrically coupled to the controller 54 and the power source 55 and may be mounted on the housing 58 or elsewhere. The controller 54 receives electrical signals from vehicle/engine sensors 57 regarding engine and vehicle operating and status conditions. The controller 54 interprets these signals to direct the power source 55 to send electrical current to the coil 48 via the wire harness 52 to control the output from the fluid-coupling device 10 in a manner described in more detail below. The coil 48 generates a second or engagement flux loop 49, which passes through the pulley 38, the hub 44, the housing 50, the projections 90, and any air gaps therebetween, such as between the pulley 38 and the projections 90 (generally designated air gap 91) and between the hub 44 and the housing 50 (generally designated air gap 93).

The water pump assembly 9 is shown in FIG. 1 as an engine-mounted water pump assembly that is driven by a crankshaft pulley system. In an alternative embodiment (not shown), the water pump assembly may be a stand-alone bracket-pulley assembly. The water pump assembly 9 consists of a central rotatable water pump shaft 56 that is bearing mounted within a stationary housing 58 which is mounted directly to the engine block near the crankshaft pulley (not shown) via mounting holes 60 using bolts or other fasteners (not shown).

The water pump shaft 56 is coupled to a plurality of impellers (not shown) used to control engine coolant flow within an engine cooling system to cool the engine. The pulley 38 is coupled to the threaded non-conductive adapter 62 of the water pump shaft 56 via the hub 44. The adaptor 62 may be formed from a non-ferrous material, such as plastic or other known suitable material or material combination. The water pump shaft 56 rotates at the same rotational rate as the pulley 38 to drive the impellers on the output shaft 20 and to provide coolant flow to the engine.

The engine-driven pulley 38 is positioned between the cover 30 and the hub 44 and is held in place by the bolts 84. The pulley 38 is sealed utilizing gaskets or the like (not shown). Fasteners other than the bolts 84 may be utilized, an example of which are rivets. The pulley 38 is coupled to the engine crankshaft via a belt 70. The pulley 38 rotates the cover 30 at an input rate determined by the engine operating speed as translated to the pulley 38 via the crankshaft and belt 70.

The cover 30 may be in the form of a die-cast aluminum part and has an overlying region 72 that is roll-formed around the outer periphery 74 of the body 22. The body 22 may also be formed of aluminum or other suitable material. The body 22 thus rotates at the same rotational rate as the cover 30. As indicated, the output shaft 20 is rotatably mounted within the body 22 and is affixed to the rotor 26. The volume of space around rotor 26 and bounded by the cover 30 and body 22 defines a fluid chamber 43, which is filled with a quantity of viscous fluid (not shown). The cover 30 and reservoir plate 28 define a fluid reservoir 41, which is coupled to the fluid chamber 43 through the fill port 29. The arm 33 covers or uncovers the fill port 29, depending upon the activation current applied on the electrical coil 48, to control the flow of fluid between the fluid reservoir 41 and fluid chamber 43. Of course, other techniques may be utilized to control the motion of the arm 33, than that disclosed herein. In addition, the fluid chamber 43 is in fluid communication with a working chamber 45, which is defined between the rotor 26, body 22, and cover 30. The amount of viscous fluid contained in the working chamber 45, in conjunction with the rotational speed of the cover 30, determines the torque transmitted to the rotor 26 and the output shaft 20. In other words, the torque response is a result of viscous shear within the working chamber 45.

The rotor 26 also includes a scavenge chamber 27 that returns viscous fluid from the working chamber 45 to the reservoir 41. Disposed adjacent the radially outer periphery of the operating chamber 45 is a pumping element 25, also referred to as a "wiper" element 25, that is operable to engage the fluid rotating in the operating chamber 45, and generate a localized region of relatively higher fluid pressure. As a result, the pumping element 25 continually pumps a small quantity of fluid from the operating chamber 45 back into the reservoir chamber 41, through a scavenge chamber 27, in a manner well known in the art.

As best shown in FIGS. 2 and 3, a first portion 202 of hub 44 is coupled to a middle portion 204 of the water pump shaft 56 via the adapter 62. The washer 208 is positioned around the middle portion 204 and between a shoulder 210 of the water pump shaft 56 and an end 212 of the adapter 62.

Referring now to FIGS. 1 and 4, the hub 44 has a center recessed portion 233 and an inner bore 235 therethrough. The hub 44 is coupled to the center projection 218 via a conductive member 231, which is slid over the center projection 218 and is disposed within the center recessed portion 233.

The armature subassembly 32 has a series of tooth-like or leaf-like projections 90 that extend perpendicular to a central region 92. The central region 92 has a central hole 94 containing a non-conductive bushing 239 that is used to position the armature subassembly 32 around the conductive member 231 and thus the center projection 218. When assembled, the projections 90 slightly overlap the respective pole pieces 215. A torsion spring (not shown) is coupled to the assembly 32 and maintains the projections 90 in a preset position wherein the projections 90 are misaligned with the respective pole pieces 215.

Upon magnetization, the subassembly 32 rotates to line up the projections 90 with the pole pieces 215. The rotation of the subassembly 32 causes the coupled valve arm 33 to rotate and cover the fill hole 29. This prevents viscous fluid flow to the working chamber 45. The reduction of viscous fluid within the working chamber 45 minimizes shearing of the viscous fluid within the working chamber 45 to drive the rotor 26 and the output member 20. Hence, a fan coupled to the output member 20 would rotate slower in this condition to bring cooling conditions within a desired range.

The valve arm 33 is coupled to the central region 92 of the valve arm assembly 32 and extends towards the reservoir plate 28. The valve arm 33 is cantilevered at its free end. The valve arm 33 rotates with the subassembly 32 to cover or uncover the fill port 29. In an unmagnetized state (wherein no electrical current is flowing through the coil 48), the torsion spring 31 maintains the subassembly 32 and valve arm 33 in a first position wherein the fill port 29 is open and not covered. This position is known as the "failsafe on" position, since fluid can flow from the fluid reservoir 41 to the fluid chamber 43 and through the fill port 29 in the absence of electrical current flowing to the coil 48. This maintains the rotor 26 and the cover 30 in an engaged state to provide cooling airflow even in the absence of electrical actuation to prevent overheating of the attached engine.

Figure 5:
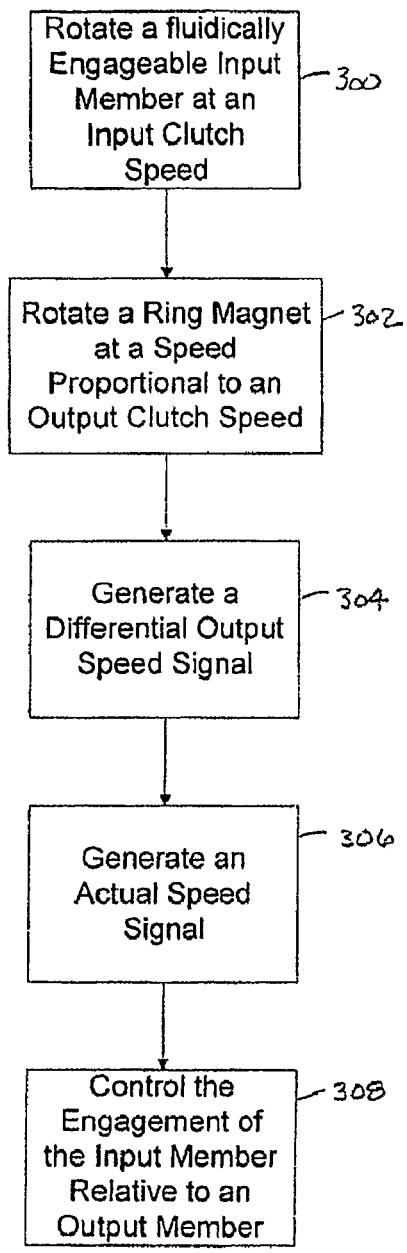
FIG. 5 is a logic flow diagram illustrating a method of controlling the engagement of a fluid-coupling device in accordance with an embodiment of the present invention.

Referring now to FIG. 5, a logic flow diagram illustrating a method of controlling the engagement of a fluid-coupling device in accordance with an embodiment of the present invention is shown. Although the following steps are primarily described with respect to the embodiments of FIGS. 1-4 above, they may be easily modified to apply to other embodiments of the present invention.

In step 300, a fluidically engageable input member, such as one or more of the input members described above, is rotated at a speed that is approximately equal to or proportional to an input clutch speed.

In step 302, a ring magnet, such as the ring magnet 220, is rotated at a magnet rotational speed, which is approximately equal to or proportional to an output clutch speed of a fluidically engageable output member. The fluidically engageable output member may include one or more of the output members described above.

In step 304, a magnetic sensor, such as the magnetic sensor 232, generates an electrical differential output speed signal that is sent to a controller of the measured differential speed. The controller may be the controller 54. The differential speed signal is indicative of the speed of the ring magnet relative to the speed of the input member.

In step 306, the controller generates an actual speed signal of the output member in response to the differential speed signal. The controller subtracts the differential speed signal from the input clutch speed to determine the actual speed of the output member. The input clutch speed can be determined, for example, through knowledge of the pulley ratio, as known in the art.

In step 308, the controller controls engagement of the input member and the output member in response to the actual speed. The calculated actual output speed, along with measurements from other sensors, such as the vehicle sensors 57, determines the amount of current that is supplied to the coil. The controller receives a set of electrical inputs from the various vehicle sensors that monitor various engine operating conditions relating to engine temperature, fuel economy, emissions or other engine operating conditions affecting the performance of the engine. For example, one of the vehicle sensors may be an engine mounted coolant sensor or a pressure sensor mounted to an air conditioner.

The amount of current supplied to the coil is proportional to the rotation of or opening of a valve, such as the valve provided by the armature assembly 32, the valve arm 33, and the port 29. The amount of electrical power supplied from the controller and/or a power source, such as the power source 55, is proportional to the amount of magnetic flux available to control the relative positioning of the valve. The current supplied to the coil may be pulse width modulated. This valve control can be used to control the speed of an output shaft, such as the output shaft 20, and thus the speed of fan blades attached thereto for cooling a fluid within a radiator of an engine.

The controller may have a stored look-up table that determines a desired engine operating range for a given engine speed. When the controller determines that one or more of the vehicle sensors are detecting conditions that are outside a desired operating range, the controller activates the coil 48. Thus, for example, if the controller determines that the engine temperature or the engine coolant temperature is too low a signal, having a desired pulse width, may be sent from the controller to the power source to activate the coil. Similarly, if the controller determines from one or more of the sensors that the engine temperature or the engine coolant temperature is above a predetermined value, no signal is sent from the controller to activate coil. The valve is thus maintained in a default open or uncovered position, which allows maximum fluid flow of fluid from a fluid reservoir to a fluid operating or working chamber. This provides a high torque response for operation of a rotor or output shaft and a high level of cooling.

The above-described steps are meant to be illustrative examples only; the steps may be performed sequentially, synchronously, simultaneously, or in a different order depending upon the application. Note that step 306 may be omitted and the controls in step 308 may be based on differential speed.

By determining the actual output speed of a rotor at a given engine input speed, and not just an approximation based on clutch characteristics, more precise control of the cooling requirements to an engine can be realized. This allows the engine to be maintained more precisely in a desired operating temperature range. This in turn also results in improved engine performance of many measurable engine systems parameters including, for example, improved fuel economy and reduced emissions. Further, as stated above, the electromagnetic differential speed sensor of the present invention may be utilized on many different types of viscous and non-viscous type clutch systems in addition to the electronically controlled viscous coupling system described herein.

While the invention has been described in connection with one embodiment, it will be understood that the invention is not limited to that embodiment. On the contrary, the invention covers all alternatives, modifications, and equivalents as may be included within the spirit and scope of the appended claims.

What is claimed is:

1. A speed monitoring system for a fluid-coupling device comprising:
   a hub rotating at a first speed proportional to an input clutch speed of a fluidically engageable input member;
   a ring magnet rotating at a second speed proportional to an output clutch speed of a fluidically engageable output member; said ring member comprising a plurality of alternating magnetic sections;
   a stationary magnetic sensor in operational relationship with said ring magnet and generating a differential speed signal of said ring magnet relative to said first speed;
   wherein said magnetic sensor comprises at least one of a hall effect sensor, a hall effect switching sensor, a latching sensor, a magnetic pick-up sensor, and an inductive sensor;
   a concentrator coupled to said magnetic sensor and directing magnetic flux through said magnetic sensor; and
   a controller electrically coupled to said magnetic sensor and generating an actual speed signal indicative of said second speed in response to said differential speed signal.

2. A system as in claim 1 wherein said hub rotates at a water pump speed.

3. A system as in claim 1 wherein said second speed is approximately equal to said output clutch speed.

4. A system as in claim 1 wherein said second speed is approximately equal to a fan speed.

5. An operational control system for a fluid-coupling device comprising:
   an input member;
   an output member fluidically engageable with and forming an operating chamber with said input member;
   a hub rotating at a first speed proportional to an input clutch speed of said input member;
   a ring magnet rotating at a second speed proportional to an output clutch speed of said output member;
   a stationary magnetic sensor and flux concentrator in operational relationship with said ring magnet and generating a differential speed signal of said ring magnet relative to said first speed; and
   a valve in fluid communication with said operating chamber; and
   a controller electrically coupled to said magnetic sensor and said valve, said controller controlling engagement of said input member with said output member in response to said differential speed signal;
   said controller generating an actual speed signal indicative of said second speed in response to said differential speed signal and controls said engagement in response thereto;
   said controller controlling fluid flow into said operating chamber in response to said differential speed signal.

6. A system as in claim 5 wherein said controller in generating said actual speed signal subtracts said differential speed signal from an input clutch speed signal.

7. A system as in claim 5 comprising a magnetic flux loop comprising said hub, said ring magnet, said magnetic sensor, and a water pump shaft.

8. A system as in claim 5 comprising:
   a coil magnetizing at least a portion of said hub;
   said controller in controlling said engagement controls operation of said coil to actuate said valve and adjust fluid flow into said operating chamber.

9. A system as in claim 8 wherein said valve comprises a valve arm, said controller in controlling said engagement adjusts position of said valve arm in relation to a fill port of said operating chamber.

10. A system as in claim 5 wherein said input member and said output member have a normally engaged default state and a disengaged state.

11. A system as in claim 5 further comprising at least one vehicle sensor generating a vehicle parameter signal, said controller controlling said engagement in response to said vehicle parameter signal.

12. A method of controlling the engagement of a fluid-coupling device comprising:
   rotating a fluidically engageable input member at an input clutch speed;
   rotating a ring magnet at a magnet rotational speed proportional to an output clutch speed of a fluidically engageable output member, said ring magnet comprising a plurality of alternating magnetic sections;
   generating a differential speed signal of said ring magnet relative to said input clutch speed by use of a stationary magnetic sensor and flux concentrator;
   generating an actual speed signal of said output member in response to said differential speed signal; and
   controlling engagement of said input member and said output member in response to said actual speed signal.

13. A method as in claim 12 wherein controlling said engagement comprises continuous variability of engagement between a fully disengaged state and a fully engaged state.

* * * * *